(12) United States Patent
Mackin et al.

(10) Patent No.: US 8,398,179 B2
(45) Date of Patent: *Mar. 19, 2013

(54) EXTENDIBLE AXLE MEMBER FOR THE REAR OF AN AGRICULTURAL HARVESTER

(75) Inventors: Ryan Patrick Mackin, Milan, IL (US); Daniel James Burke, Cordova, IL (US); Bruce Alan Coers, Hillsdale, IL (US); Eric Allan Risius, Hampton, IL (US); Glenn E Pope, Viola, IL (US); David Rix, Sandy, UT (US)

(73) Assignee: Deere & Company, Moline, IL (US)

(*) Notice: Subject to any disclaimer, the term of this patent is extended or adjusted under 35 U.S.C. 154(b) by 193 days.

This patent is subject to a terminal disclaimer.

(21) Appl. No.: 12/774,354

(22) Filed: May 5, 2010

(65) Prior Publication Data

US 2011/0273003 A1   Nov. 10, 2011

(51) Int. Cl.
 *B60B 35/10* (2006.01)
 *B60G 9/02* (2006.01)
(52) U.S. Cl. ............... 301/128; 301/124.1; 280/124.11; 280/124.111; 180/209
(58) Field of Classification Search ............ 301/124.1, 301/128, 131, 132; 280/124.11, 124.111; 180/209, 24.01, 24.02, 24.03
See application file for complete search history.

(56) References Cited

U.S. PATENT DOCUMENTS

| | | | |
|---|---|---|---|
| 2,151,045 A | 3/1939 | Ploehn | |
| 2,750,199 A * | 6/1956 | Hart | 280/638 |
| 3,894,598 A * | 7/1975 | Yeou | 180/9.48 |
| 4,040,643 A | 8/1977 | Applequist et al. | |
| 5,121,808 A | 6/1992 | Visentini et al. | |
| 5,326,128 A * | 7/1994 | Cromley, Jr. | 280/656 |
| 5,464,243 A | 11/1995 | Maiwald et al. | |
| 5,489,114 A * | 2/1996 | Ward et al. | 280/638 |
| 6,206,125 B1 * | 3/2001 | Weddle | 180/209 |
| 6,386,554 B1 * | 5/2002 | Weddle | 280/6.154 |
| 6,715,576 B2 * | 4/2004 | Filho | 180/209 |
| 7,163,227 B1 * | 1/2007 | Burns | 280/638 |
| 2004/0130114 A1 * | 7/2004 | Weichholdt | 280/86.751 |
| 2011/0148053 A1 * | 6/2011 | Motebennur et al. | 280/6.16 |

OTHER PUBLICATIONS

European Search Report, Aug. 16, 2011, 4 pages.

* cited by examiner

*Primary Examiner* — Kip T Kotter

(57) ABSTRACT

An extendible axle member (146, 148) is provided for an agricultural harvester (100), the axle (142, 144) having an elongate telescopic portion (400) with bearing surfaces (254, 256, 334, 336) for being slidably received in an outer axle member (142, 144).

14 Claims, 6 Drawing Sheets

EXTENDIBLE AXLE MEMBER FOR THE REAR OF AN AGRICULTURAL HARVESTER

FIELD OF THE INVENTION

The invention concerns an extendible axle member for the rear of an agricultural harvester.

BACKGROUND OF THE INVENTION

Agricultural combines are heavy large machines that harvest, thresh, separate and clean harvested crop, planted agriculturally that carries corn. They include steerable rear wheels mounted on the free ends of rear axles that pivot about a central longitudinal axis.

The axles are telescopic and can be varied in length by stopping the vehicle, loosening clamps and forcing the extendible axle member in (or out) of an outer axle member until a desired axle length is achieved, then tightening short axle clamps to lock the extensible axle member and the outer axle member in that position.

In new harvesters, it has been proposed to permit the extendible axle of the combine to slide in and out of the outer axle while the vehicle is being driven through a field. Hydraulic actuators have been considered for use to extend the axles during operation. In this arrangement the extendible axle member and outer axle member may be provided with a releasable clamp that can be opened when the axles are telescoped and then reapplied when the axle has the desired length.

Axles that can be extended and retracted while the agricultural combine is under way performing its harvesting functions will require improved axles with tighter tolerances. In addition, other activities typically performed by the operator when manually extending and retracting the axle will have to be performed automatically or eliminated.

One such function is insuring that the inner telescopic axle member is clean before retracting it into the outer telescopic axle member to prevent jamming, corrosion, or undue wear.

U.S. Pat. No. 5,121,808 shows a telescoping steering axle with a non driven (gauge) wheel supported on an inner axle member. The inner axle slides loosely into the outer axle and is clamped against one side of the outer axle by bolts that pass through the inner and outer axle. The bolts are located at the outer end of the outer tube and the inner tube is unsupported. See the cutaway in FIG. 1.

U.S. Pat. No. 5,464,243 shows an extendible axle for a self-propelled sprayer having an outer axle and an inner axle. A clamping arrangement in the form of a V-shaped wedge with plastic shims on top is provided at the bottom of the outer end of the outer tube. The inner end of the inner axle tube is unsupported. Bolts in the bottom of the outer tube are provided to abut the wedge and force it up against the inner tube, lifting the inner tube and wedging in against a plastic shim at the top of the outer tube. The bolts are tightened to lock the inner tube in position with the new preferred row spacing U.S. Pat. No. 5,489,114 shows a telescopic axle assembly for an aerial work platform having wheels that are telescopically extended to increase the wheelbase and make the vehicle more stable when the vehicle is stopped and the aerial work platform is being used. The axle is constructed of three nested telescopic member, a central hollow square tubular member fixed to the chassis and two hollow square tubular members in which each of the three members is telescoped inside the other. Bearing strips of undetermined shape are located between the top and side walls of the three members to facilitate the extension and contraction of the tubular members.

Purpose of the Invention

The purpose underlying the invention herein is seen in the need to provide an improved rear axle that maintains the tolerance, reduces wear and is more resistant to torsional loads applied to the axle while it is underway without the need for a manual clamp to hold the telescopic axle members in a fixed position. This capability is provided by the novel geometry of the extendible rear axle described herein.

SUMMARY OF THE INVENTION

The problem is solved according to the invention by the teaching of at least one independent claim, where the further patent claims cite characteristics that further develop the solution to great advantage.

In accordance with a first invention, an extendible axle member for an agricultural combine is generally rectangular with beveled bearing surfaces at each corner of the rectangle. The bearing surfaces are planar. Together they support the whole weight of the vehicle applied that axle. The bearing surfaces are disposed in a trapezoidal or rectangular pattern, with two upper bearing surfaces located above to lower bearing surfaces.

The four bearing surfaces face away from each other, with two upper bearing surfaces facing upward and outwardly away from each other and also away from the extendible axle member, and with two lower bearing surfaces facing downward and away from each other and also away from the extendible axle member.

The bearing surfaces are disposed at an angle of 45 degrees with respect to vertical and horizontal.

The vertical arrangement of the bearing surfaces is such that a first lower bearing surface is disposed directly below a first upper bearing surface, and a second lower bearing surface is disposed directly below a second lower bearing surface.

The bearing surfaces are disposed in an outwardly facing direction such that no plane that extends outward from and is normal to the surface of any bearing surface intersects any other such plane of any other bearing surface. The outer end of the extendible axle member has steering knuckle mounts for mounting a steering knuckle. The steering knuckle mounts define an axis of rotation that (in a direction parallel to the sliding movement of the extendible axle member) is located between vertical pairs of the 4 bearing surfaces, behind the forward two bearing surfaces and ahead of the rear two bearing surfaces The axis rotates generally vertically, although it may have a slight caster or camber angle, such as shown in the attached figures.

To control wear, the bearing surfaces are designed such that diagonally opposing pairs of bearing surfaces are parallel to each other. A reaction torque applied to the extendible axle member when the drive motor rotates the wheel on the end of the axle will not cause a force imbalance that would drive the extendible axle member up or down inside the outer telescopic axle member in which it is supported.

Furthermore, each pair of diagonally opposed bearing surfaces are offset from one another such that when a torque is applied to the extendible axle member in reaction to the hydraulic motor driving the wheel and rotation, the two bearing surfaces will be able to provide account or acting torque to resist rotating without applying extremely large forces to the bearing surfaces themselves if they were directly opposite to each other.

Since the extendible axle member is intended to be slidingly supported on its 4 bearing services and not to be clamped down with a separately applied axle clamp, the forces that are applied to each bearing surface will be applied evenly over the bearing surface and in a direction perpendicular to the bearing surface. When a torque is applied to the extendible axle member, therefore, it will be resisted by reaction forces that are also applied directly to the bearing surfaces and spread evenly over the surfaces. With this arrangement, it is beneficial that the bearing surfaces be offset from one another such that when equal and opposite normal forces spread evenly over the bearing surfaces of diagonally opposed bearings are applied, they will be capable of resisting any torque without damaging the bearing surfaces themselves, or the bearing surfaces upon which they rest.

This offset between diagonally opposed bearing surfaces is preferably large enough that a plane passing through a longitudinal axis passing through the center of area of the extendible axle member and normal to at least one of the diagonally opposed bearing surfaces will have one of the diagonally opposed bearing surfaces on a first side of the plane, and the other of the diagonally opposed bearing surfaces on a second side of the plane. This would provide complete non-overlap of the diagonally opposed bearing surfaces, and thus permit them to handle larger torque loads.

Of course, both bearing surfaces of each diagonal pair can be parallel to each other, and thus they would both be parallel to the plane passing through the center of area.

Perhaps the best angle at which the bearing surfaces can be placed is at 90° with respect to each other, and at 45° with respect to vertical and horizontal. In this way, slack can be taken out of each axle is described herein without shifting the position of the axle forwarder rearward with respect to the combine chassis. The axle would remain in its fore-and-aft position, and all slack would be taken out of the bearings merely by lifting the extendible axle member upward within the outer axle member that telescopically supports it.

When the bearing surfaces are disposed at 45° angles to each other, diagonally opposed pairs of bearing surfaces can be made to offset each other, and thus to effectively resist torque by increasing the height of the extendible axle member, making it taller than it is wide, preferably (as illustrated herein) between 1.8 and 2.2 times as tall as it is wide. Again, this will serve to offset the diagonally opposed bearing surfaces and permit them to resist torque supplied to the extendible axle member without transferring undue and possibly damaging loads to the bearing surfaces. It would furthermore provide greater beam strength to the extendible axle member permitting it to carry a greater vehicle load.

BRIEF DESCRIPTION OF THE DRAWINGS

Embodiments of the several inventions identified above are explained on the basis of the FIGURES, in which.

DETAILED DESCRIPTION OF THE PREFERRED EMBODIMENTS

In the discussion below, "forward", "front", "in front of" or like words refer to the forward direction of travel of the agricultural combine, which is parallel to the longitudinal axis of the agricultural combine, and also parallel to the pivoting axis of the rear axle. In the discussion below, "rearward", "rear", "behind", and like words refer to the direction opposite to the forward direction of travel of the agricultural combine.

In the discussion below, the description of features or structures of the right side of the rear axle assembly is identical for the left side of the rear axle assembly, and the novelties noted and/or claimed with regard to the right side of the rear axle assembly are equally as novel for the left side. Only the right side is described in detail below for convenience. The comments made regarding the right side are equally applicable to the left side, but in mirror relation. The rear suspension is mirror symmetrical about a vertical plane that contains the pivoting axis of the rear axle assembly.

Figure 1:
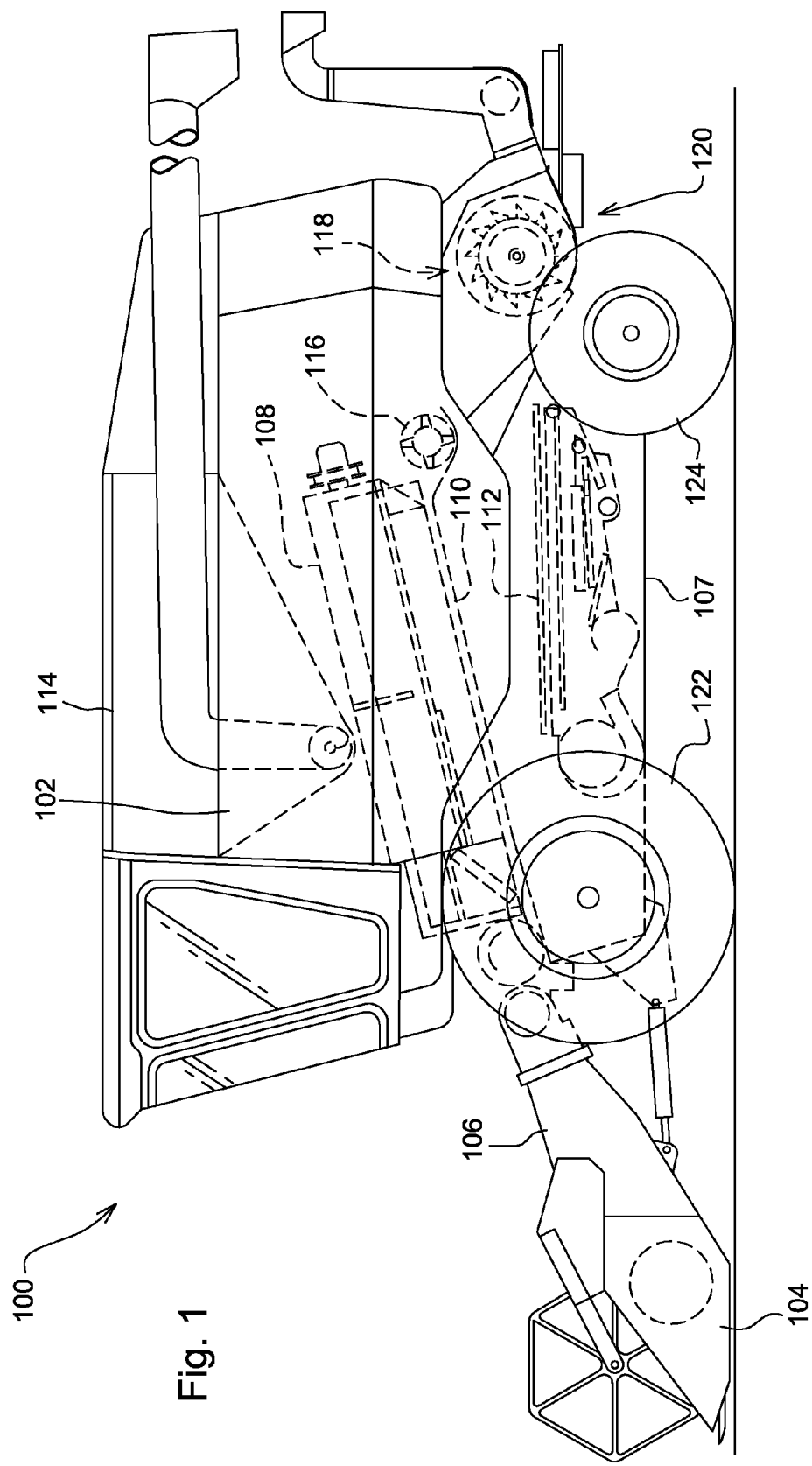
FIG. 1 shows a partial phantom left side view of an agricultural harvester in accordance with this invention.

FIG. 1 illustrates an agricultural harvester 100 in accordance with the present invention. The harvester comprises a harvester vehicle 102 having a harvesting head 104 supported on a feederhouse 106 that is mounted on the front of harvester vehicle 102 on the vehicle chassis 107. A longitudinally extending rotor 108 is disposed to rotate within a concave 110 to separate crop material (i.e. grain) from crop residue.

An oscillating cleaning shoe 112 is supported underneath the concave to receive crop material. The crop material is cleaned in the cleaning shoe and is carried upward into a grain tank 114. Crop residue leaving the rear end of rotor 108 is directed into a beater 116 which separates some residual crop material from the crop residue and directs that residual crop material into the cleaning shoe 112. Crop residue exiting the beater 116 is directed rearward into an inlet 118 of chopper 120. Similarly, crop residue separated from the material in the cleaning shoe 112 is also directed into chopper 120. The crop residue exiting beater 116 typically includes cornstalks. The crop residue exiting the cleaning shoe typically includes chaff and other light crop residue.

Identically arranged left and right front wheels 122 (only the left is shown) are coupled to the chassis 107 to support the front of the harvester on the ground. They are driven in rotation by hydraulic drive motors to propel the harvester. Identically arranged left and right rear drive wheels 124, 126 (only 124 shown in FIG. 1) are coupled to the chassis 107 to support the rear of the harvester on the ground.

Figure 2:
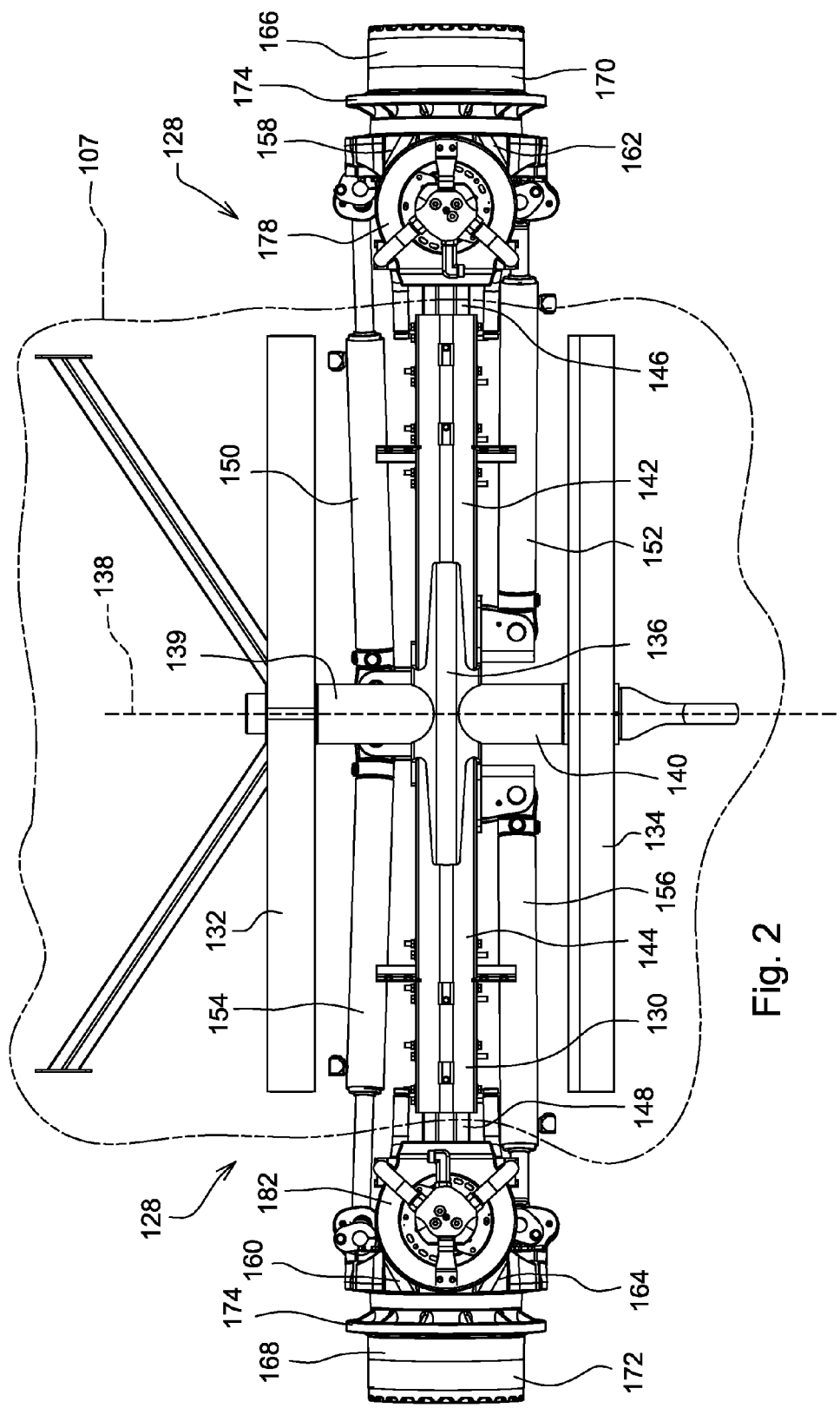
FIG. 2 is a fragmentary top view of the rear suspension of the harvester of FIG. 1.
Figure 3:
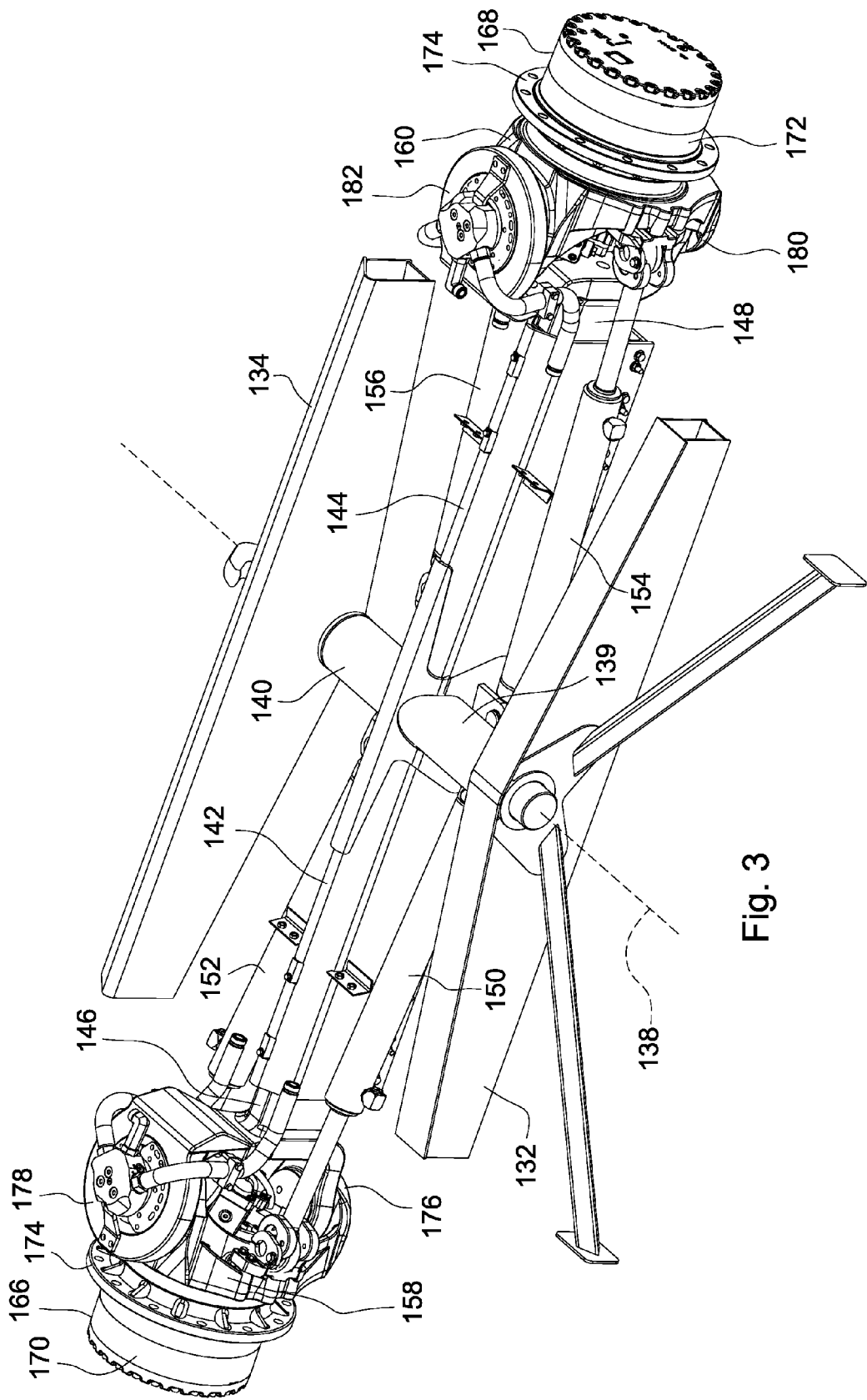
FIG. 3 is a perspective top view of the rear suspension of the harvester of FIGS. 1-2.

Referring to FIGS. 2 and 3, the chassis 107 is supported on a rear axle assembly 128 that includes a steerable rear axle 130 supported on front and rear axle mounts 132, 134. Front and rear axle mounts 132, 134 are fixed to the bottom of the chassis 107 and support central axle member 136 for pivoting about longitudinal pivot axis 138.

The central axle member 136 is in the form of a cross, with a forwardly extending tubular coupling 139 supported for pivoting in front axle mount 132 and a rearwardly extending tubular coupling 140 supported for pivoting in rear axle mount 134. Central axle member 136 also comprises right and left outer axle members 142, 144 that are fixed rigidly to, and extend to the right and to the left from, the couplings 139, 140 to form the rigid elongate central axle member 136.

The rear axle assembly 128 is symmetric about a vertical plane that passes longitudinally through the agricultural harvester and in particular through the longitudinal pivot axis 138. Henceforth, any discussion of one side of the rear axle assembly is true for the other side as well.

Rear axle assembly 128 further includes right and left extendible axle members 146, 148 that are slidably supported in right and left outer axle members 142, 144, respectively, to be slid in and out by hydraulic actuators 150, 152 here shown as hydraulic cylinders (on the right side) and hydraulic actuators 154, 156, here shown as hydraulic cylinders (on the left side).

The hydraulic actuators are disposed on each side of the outer axle members and are coupled at their inner ends to their respective outer axle member and at their outer ends to right and left and left steering knuckles 158, 160 that in turn are pivotally mounted to steering knuckle mounts on the outer ends of the extendible axle members. By this arrangement, the extendible axle members can be extended from or retracted into the outer axle members by extending or retracting the hydraulic cylinders. Further, the steering knuckles are pivotally coupled to the ends of the extendible axle members and can be steered to the left or right by extending one of the hydraulic actuators more or less than the other of the hydraulic actuators.

The right and left steering knuckles 158, 160 support right and left hydraulic motors 162, 164 on lower and upper, right and left steering knuckle mounts 176, 178, 180, 182 that are coupled to and drive right and left planetary gearboxes 166, 168. Right and left output shafts from the planetary gearboxes drive right and left wheel hubs 170, 172, in rotation. Each of the wheel hubs has a flange 174 to which the rear wheels are attached. Thus the hydraulic motors drive the wheels in rotation. Since they are mounted to the steering knuckles, the motors and the wheels can be extended or steered to the right and to the left by selectively extending and retracting the hydraulic actuators.

Figure 4:
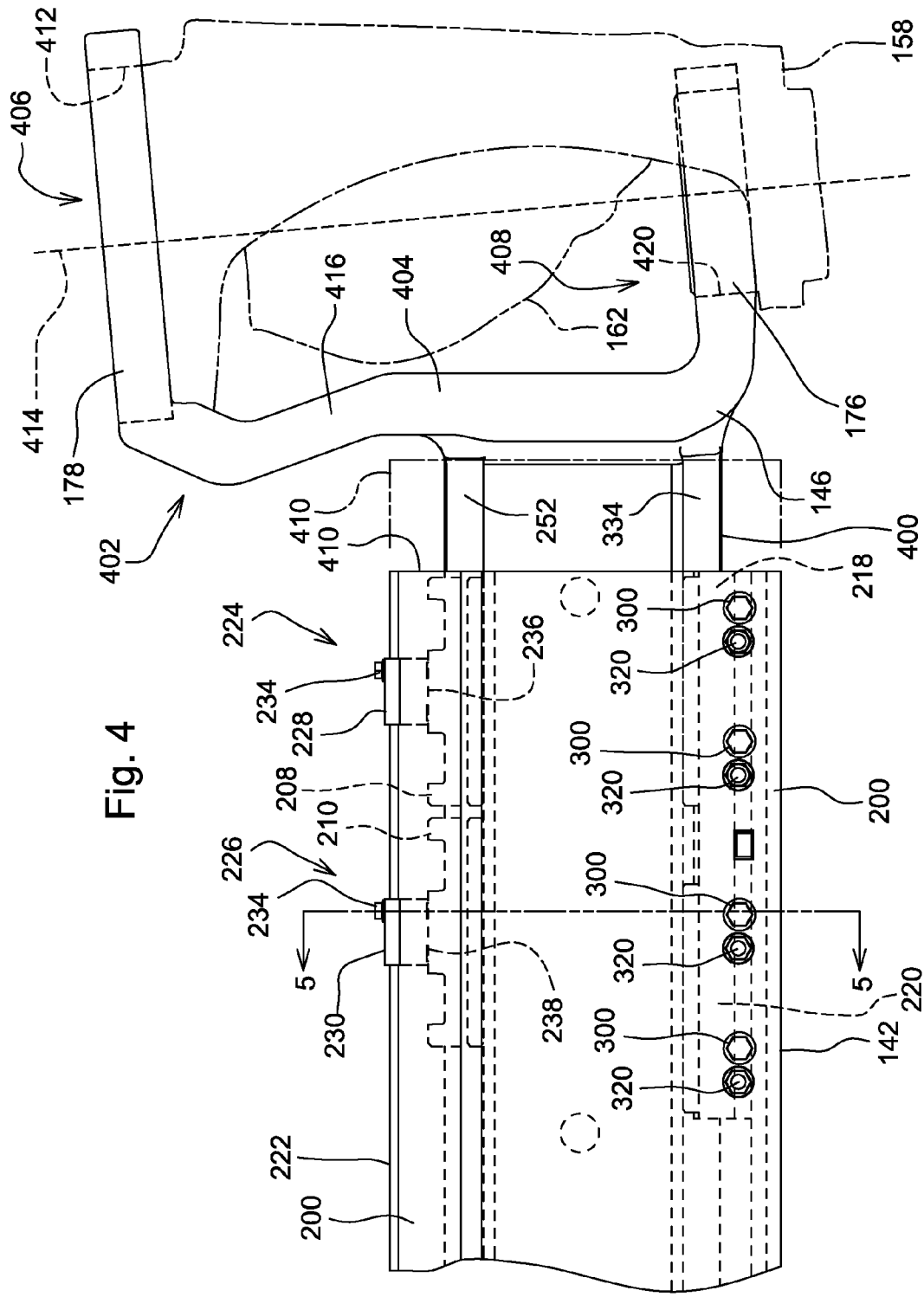
FIG. 4 is a fragmentary rear view of the right side extendible axle member and outer axle member of FIGS. 2-3.
Figure 5:
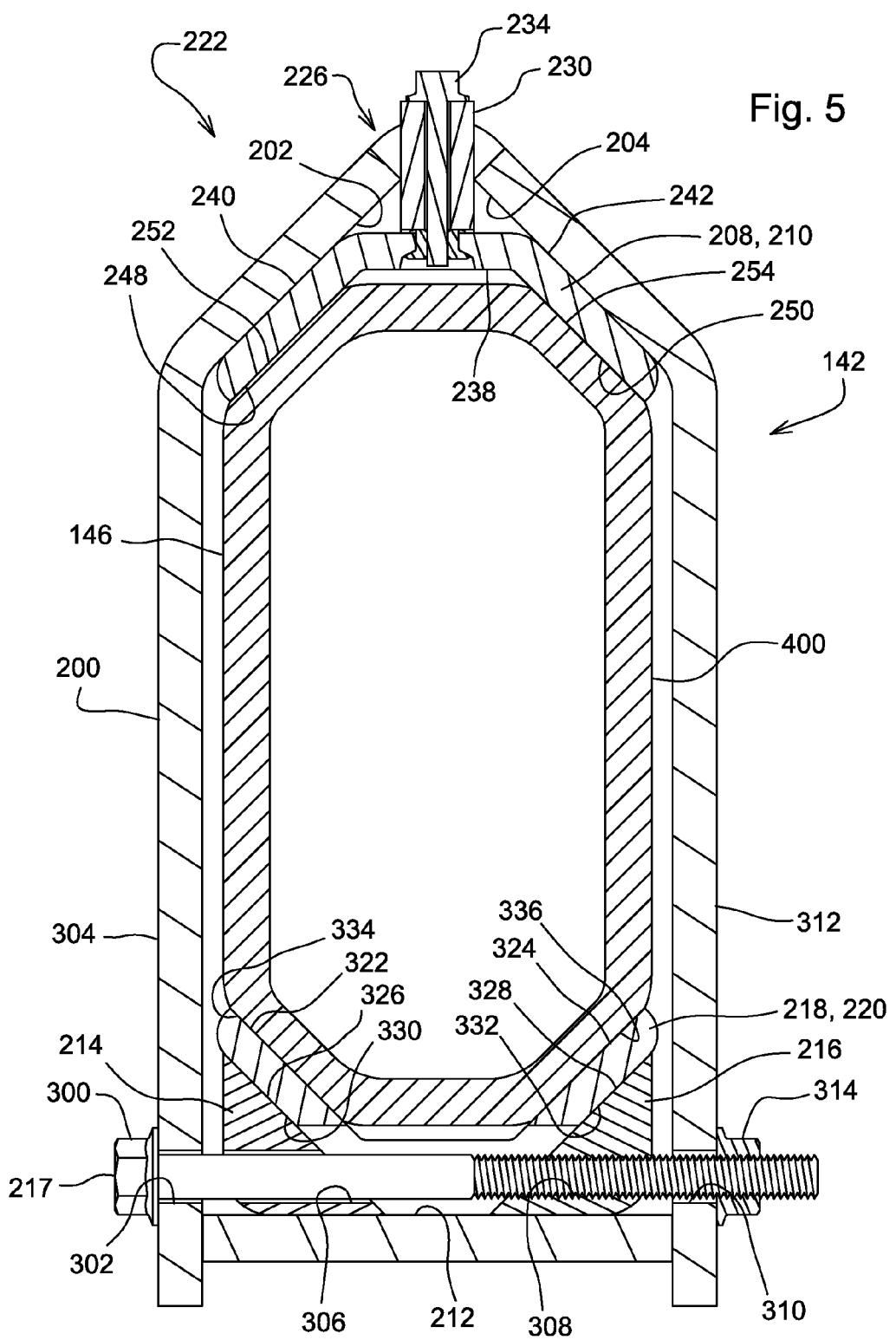
FIG. 5 is a cross-sectional view of the right side extendible axle member and outer axle member of FIG. 4 taken at section line 5-5 in FIG. 4.

Referring to FIGS. 4 and 5, the right outer axle member 142 is comprised of an elongate tubular structure 200 having a constant cross sectional profile over its length that supports the right extendible axle member 146 over substantially the entire length of the right extendible axle member when the right extendible axle member is inserted completely into the outer axle member. Inside planar top surfaces 202, 204 support V-shaped planar bearings 208, 210. Planar bottom surface 212 supports two elongate triangular adjustment members 214, 216, which in turn support V-shaped bearings 218, 220.

Elongate tubular structure 200 has a peaked top surface 222. This peaked arrangement helps prevent plant matter from collecting on top of the axle. By keeping the top of elongate tubular structure 200 clean, less material falls long to the exposed upper surface of extendible axle member 146, and therefore less material contaminates the sliding bearing surfaces of V-shaped planar bearings 208, 210.

Spaced apart rectangular slots 224, 226 are configured to receive guide members 228, 230 that are fixed to the top of V-shaped planar bearings 208, 210. Removable fasteners 234 fix guide members 228, 230 to a central web 236, 238 of V-shaped planar bearings 208, 210 to extend upwardly therefrom.

The outer and upper surfaces 240, 242 of V-shaped planar bearings 208, 210 abut the inside top surfaces 202, 204 of elongate tubular structure 200. Inside top surfaces 202, 204 are disposed at a 90° angle to each other. Upper surfaces 240, 242 are disposed at a 90° angle to each other and are coplanar with inside top surfaces 202, 204, respectively.

The inner surfaces 248, 250 of each of V-shaped planar bearings 208, 210 are planar and are disposed at a 90° angle to each other. They are also parallel to and spaced equidistantly from outer and upper surfaces 240, 242, respectively.

Inner surfaces 248, 250 are configured to slidingly engage two upper and outer surfaces 252, 254 of right side extendible axle member 146. Upper and outer surfaces 252, 254 are also disposed at a 90° angle to each other.

V-shaped bearings 208, 210 are held in place with respect to elongate tubular structure 200 by guide members 228, 230. When right extendible axle member 146 is extended and retracted with respect to elongate tubular structure 200 by hydraulic cylinders 150, 152, surfaces 252, 254 function as bearings and slide against inner surfaces 248, 250.

V-shaped bearings 208, 210 are disposed one behind the other longitudinally along the inside length of elongate tubular structure 200. In the preferred arrangement illustrated here, two V-shaped bearings 208, 210 are provided to support right extendible axle member 146 within elongate tubular structure 200. In an alternative arrangement, more V-shaped bearings could be provided to support the extendible axle member 146 over greater length when the extendible axle member 146 is completely retracted within elongate tubular member 200.

The two elongate triangular adjustment members 214, 216 are disposed inside and rest upon the planar bottom surface 212 of elongate tubular structure 200. They are not fixed to the planar bottom surface 212, but can be translated in a direction perpendicular to the longitudinal extent of elongate tubular member 200, toward and away from the lower portion of extendible axle member 146.

For each V-shaped bearing, two first bolts 300 extend through a clearance aperture 302 in a first lower sidewall 304 of elongate tubular structure 200. Bolts 300 extend through a second clearance aperture 306 in elongate triangular adjustment member 214. Bolts 300 are then threadedly engaged in a threaded aperture 308 in the elongate triangular adjustment member 216. The threaded free end portions of bolts 300 extend completely through a third clearance aperture 310 in a second lower sidewall 312 of elongate tubular structure 200. Lock nuts 314 are threadedly engaged to the portion of bolts 300 that extends completely through elongate tubular structure 200, and are locked against the outer surface of second lower sidewall 312 to prevent bolts 300 from rotating with respect to elongate tubular structure 200.

In this arrangement, bolts 300 are under tension and hold elongate triangular adjustment member 216 against an outer lower surface of V-shaped bearings 218, 220. When agricultural harvester 100 is driven through the field, an outward force is applied by extendible axle member 146 to V-shaped bearings 218, 220, which is further communicated to elongate triangular adjustment members 214, 216, attempting to drive them apart (i.e. to drive member 214 to the left, and to drive member 216 to the right in FIG. 5). The rightward force applied to elongate triangular adjustment member 216 is resisted by bolts 300, which are placed in tension by this rightward force. This rightward force is communicated through the threads of the adjustment member 216 into the threads of the bolts 300, and up the shaft of the bolts, where rightward movement is resisted by the heads 217 of bolts 300.

In a prior art arrangement, movement of adjustment members away from a sliding axle member is provided by studs that are threaded engaged to the relatively thin sidewall of elongate tubular structure 200. This tends to strip the threads of the studs and the sidewall of the outer axle member.

Bolts 320 are identically arranged as bolts 300, and provide the identical function as bolts 300, by extending in the opposite direction as bolts 300 through a clearance hole in lower sidewall 312, through another clearance hole in elongate triangular adjustment member 216, and are threadedly engaged to elongate triangular adjustment member 214 in an identical fashion, but in a mirror image arrangement. Bolts 320 by their threaded engagement with elongate triangular adjustment member 214, resist outward forces against member 214, and communicate those tensile forces to the heads of bolts 320.

Elongate triangular adjustment members 214, 216 are provided to eliminate slack between the extendible axle member 146 and elongate tubular structure 200. As the bearing surfaces 322, 324 provided on the V-shaped bearings 218, 220 begin to wear, slack is produced. This slack is eliminated by loosening the lock nuts on bolts 300, 320, then tightening bolts 300, 320. Tightening the bolts draws elongate triangular adjustment members 214, 216 inwardly toward each other in a horizontal direction across the planar bottom surface 212 of elongate tubular structure 200.

Elongate triangular adjustment members 214, 216 have two bearing support surfaces 326, 328 that bear against bearing surfaces 330, 332. As bearing support surfaces 326, 328 are drawn together in this adjustment process, they slide inward against bearing surfaces 330, 332 from opposite sides and in opposite directions thereby forcing V-shaped bearings 218, 220 straight upward (assuming members 214, 216 are adjusted the same distance), eliminating the slack, and moving sliding bearing surfaces 322, 324 upward against the lower bearing surfaces 334, 336 of extendible axle member 146. When bolts 300, 320 are tightened an equal amount, the effect is to lift extendible axle member 146 straight upward, without bringing it closer to one side or the other of elongate tubular structure 200. It retains its fore-and-aft position in the axle assembly. This beneficially maintains the steerable rear axle dynamics and its caster and camber angles.

V-shaped bearings 218, 220 therefore slide in the longitudinal direction (the front to rear direction) with respect to their supporting members (members 214, 216) while translating vertically with respect to the axle housing (structure 200). V-shaped bearings 218, 220 are pinched from both sides between members 214, 216 when the gap between members 214, 216 is narrowed and are thereby forced upward, reducing the slack.

Surfaces 322, 324 are at a 90° angle with respect to each other and are each at 45° with respect to vertical. Surfaces 326, 328 are at a 90° angle with respect to each other, and are each at 45° with respect to vertical. Surfaces 330, 332 are at a 90° angle with respect to each other, and are each at 45° with respect to vertical. Surfaces 334, 336 are at a 90° angle with respect to each other, and are each at 45° with respect to vertical. Surfaces 322, 326, 330 and 334 are planar and parallel to each other. Surfaces 324, 328, 332, and 336 are planar and parallel to each other.

Figure 6:
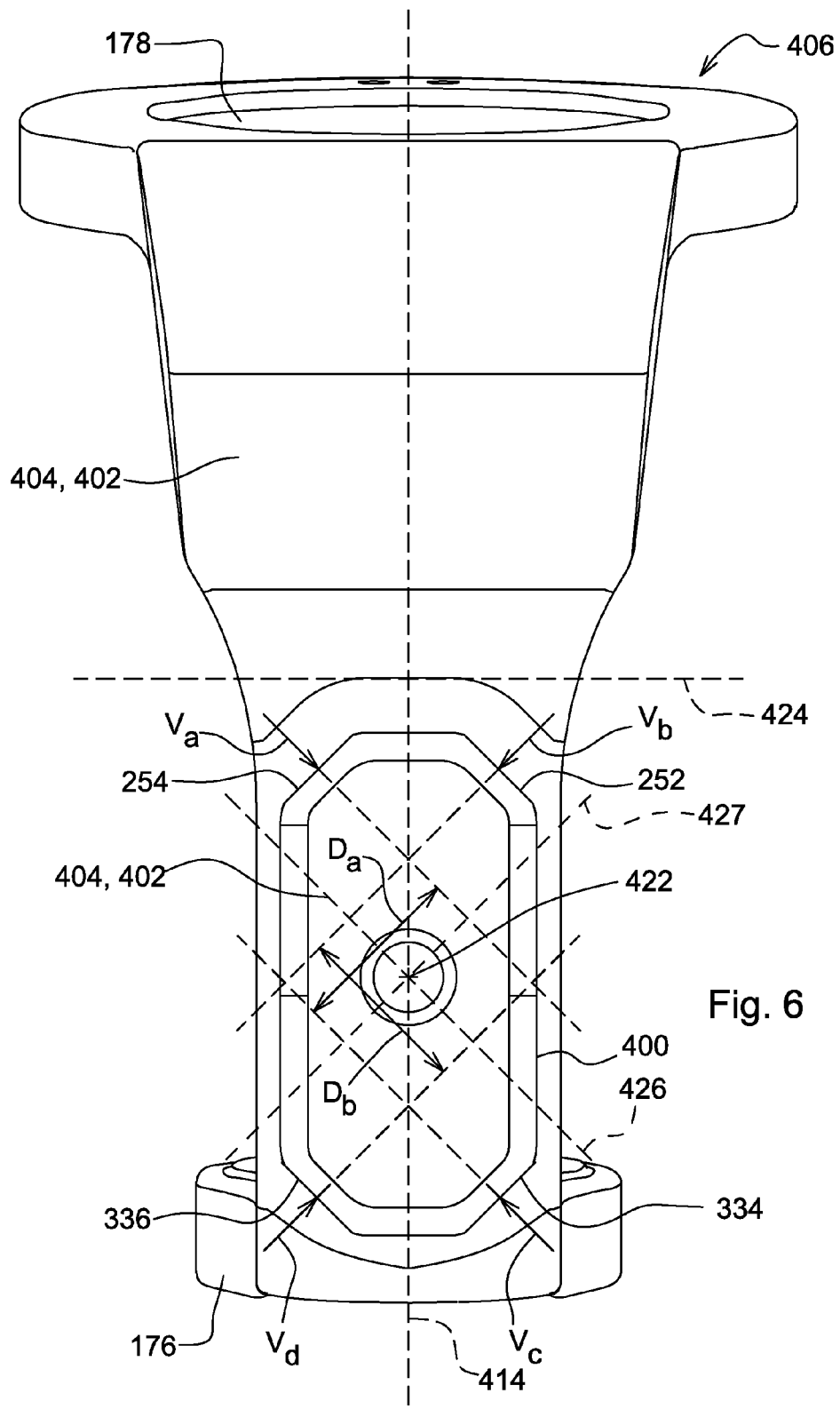
FIG. 6 is a left side view of the right side extendible axle member of the foregoing FIGURES.

Referring now to FIG. 6, the extendible axle member 146 is formed of an elongate portion 400 that is fixed to and formed integral with a C-frame 402, which is in turn comprised of a vertical member 404 to which an upper horizontal member 406 is fixed and to which a lower horizontal member 408 is fixed.

Elongate telescopic portion 400 is formed integral with or is fixed permanently to C-frame 402. The former is preferably achieved by simultaneously casting or forging the C-frame 402 and the elongate telescopic portion 400. The latter is preferably achieved by welding C-frame 402 to elongate telescopic portion 400

Elongate telescopic portion 400 has bearing surfaces 252, 254, 334, 336, each disposed at a 45° angle with respect to vertical. Bearing surfaces 252, 254, 334, 336 form beveled corners of elongate telescopic portion 400. The surfaces are planar and extend substantially the entire length of elongate telescopic portion 400.

Elongate telescopic portion 400 is configured to be received completely within elongate tubular structure 200 such that it is supported solely upon bearing surfaces 248, 250, 322, and 324 of V-shaped bearings 208, 210, 218, and 220. Bearing surfaces 248, 250, 322, and 324 are disposed at four corners of elongate tubular structure 200 and support the elongate telescopic portion 400 at four corners. The four bearing surfaces 248, 250, 322, and 324 support elongate telescopic portion 400 within elongate tubular structure 200 such that the bottom wall and sidewalls of elongate tubular structure 200 do not contact elongate telescopic portion 400. Similarly, the bottom wall, top wall, and sidewalls of elongate telescopic portion 400 do not contact elongate tubular structure 200.

Vertical member 404 is larger in left side view (i.e. as viewed in FIG. 6: in a direction parallel to the longitudinal extent of elongate telescopic portion 400) than the elongate telescopic portion 400. Vertical member 404 cannot therefore be received in the open outer end 410 of tubular structure 200. The robust way in which elongate tubular structure 200 is constructed together with the V-shaped bearings 208, 210, 218, 220 permits a very compact telescopic portion—compact in both the vertical and horizontal directions—that permits the axle itself to be made light weight and smaller, such that the C-frame 402 extends forward of the forwardmost portion of elongate telescopic portion 400, the C-frame 402 extends behind the rearmost portion of elongate telescopic portion 400, the C-frame 402 extends above the uppermost portion of elongate telescopic portion 400, and the C-frame 402 extends below the lowermost portion of elongate telescopic portion 400.

Upper horizontal member 406 has a steering knuckle mount 178. Lower horizontal member 408 has a steering knuckle mount 176. Steering knuckle mount 178 is defined by a first aperture 412 that defines a generally vertical steering axis 414. Steering knuckle mount 176 is defined by a second aperture 420 having a smaller diameter than the diameter of first aperture 412. Axis 414 passes through and is defined by the center of second aperture 420.

Axis 414 is oriented generally vertically and preferably slightly away from vertical to provide a suitable caster angle and camber angle for the right rear wheel.

In order to locate the steering knuckle as closely as possible to the side of the combine, vertical member 404 is provided with a bend 416 that permits an upper portion of vertical member 404 to extend over the top of outer end 410 of tubular structure 200. The position 418 of outer end 410 when elongate portion 400 is completely retracted into elongate tubular structure 200 is shown in dashed lines in FIG. 4. To permit the upper steering knuckle to extend over the top of outer end 410, the elongate portion 400 is fixed asymmetrically to vertical member 404, such that the center of area 422 (FIG. 6) of the elongate telescopic portion is disposed below the vertical midline 424 of the vertical member 404. As shown in FIG. 4, elongate portion 400 is fixed to the bottom half of vertical member 404 completely below the vertical midline 424 of the vertical member 404.

This arrangement provides a housing for the motor 162, the housing being defined by the C-frame 402 and steering knuckle 158 which substantially enclose hydraulic motor 162.

The elongate telescopic portion 400 is rectangular, not square. It is greater in its vertical extent (height) than in its horizontal extent (width). This offsets diagonally disposed bearing surface 254, 334 and diagonally disposed bearing surface pair 252, 336.

Each of the two diagonally offset pair of bearings 254, 334, and 252, 336 have surfaces that are opposed to each other: the surfaces lie in parallel planes, facing in opposite directions. When the motor 162 drives the wheel on the end of extendible axle portion 146 in rotation, one pair of diagonally opposed bearing surfaces 254, 334 resists motor-induced rotation in one direction, and the other pair of diagonally opposed bearing surfaces 252, 336 resists motor-induced rotation in the other direction. The forces applied to each bearing surface are normal to that bearing surface. They are distributed evenly across the entire bearing surface, and therefore can be modeled by a single force vector located at the midline of the bearing surface. The force vector due to motor torque applied to surface 254 is identified as "Va". The force vector due to motor torque applied to surface 252 is identified as "Vb". The force vector due to motor torque applied to surface 334 is identified as "Vc". The force vector due to motor torque applied to surface 336 is identified as "Vd". (FIG. 7) The lines of action of the forces acting on diagonally opposed surfaces are offset from each other by a distance "Da" and "Db". The offset distances "Da" and "Db" illustrated herein are equal since the elongate telescopic portion 400 is symmetrical.

Each diagonally opposed pair of bearing surfaces shown in the illustrations herein is completely offset. A plane 426 disposed between bearing surface 254 and bearing surface 334 that extends perpendicular to the bearing surfaces and hence parallel to the forces acting on the bearing surfaces does not intersect either bearing surface. Plane 426 is illustrated herein passing through the center of area 422 of elongate telescopic portion 400, although it need not do so. Forces therefore cannot act on any portion of the bearing surface and be directly opposed along the same axis by a force applied to the diagonally opposed bearing surface. All the forces applied to diagonally opposing bearing surfaces generate a torque resisting the torque generated by motor 162. A force applied to any portion of the bearing surfaces 254, 334 generates a torque.

The same would be true about the other diagonally opposed pair of bearing surfaces 252, 336 due to the symmetry of the elongate telescopic portion 400 about a vertical axis and a horizontal axis. Thus the elongate telescopic portion 400 can resist torques applied when it accelerates in the forward direction and in the reverse direction. This is indicated by a second longitudinally extending plane 427 similar to plane 426, that passes through the center of area 422 of the elongate telescopic portion. As with plane 426, plane 427 is also perpendicular to two bearing surfaces (bearing surfaces 252, 336 in the case of plane 427) and is disposed between bearing surfaces 252,336 such that the bearing surfaces 252, 336 are located on opposite sides of the second longitudinally extending plane 427.

Vertical member 404 is fixed to and formed integral with the outer end of elongate telescopic portion 400 such that vertical member 402 of C-frame 402 is in an abutting relation with elongate telescopic portion 400. Elongate telescopic portion 400 is hollow over substantially its entire length, and is enclosed at its outer end by vertical member 404 which is fixed across this opening. This provides superior strength as compared to axles in which the C-frame is entirely eliminated and upper and lower steering knuckle mounts are formed in the top wall and bottom wall of an elongate extendible tubular portion similar to the elongate telescopic portion 400.

The invention claimed is:

1. An extendible axle member (146, 148) for an agricultural harvester (100), the harvester having a chassis (107) supported on two driven front wheels (122) and two driven and steerable rear wheels (124), the rear wheels (124) being supported on a rear axle assembly (128) that includes a central axle member (136) supported on the chassis to pivot about a horizontal and longitudinally extending axis, the central axle member (136) including left side and right side outer axle members (142, 144), each of the left and right side outer axle members (142, 144) being configured to telescopically receive and support the extendible axle member (146, 148), the extendible axle member (146, 1481 comprising an elongate telescopic portion (400) having a generally rectangular shape defined by horizontal top and bottom sidewalls and two opposing vertical sidewalls, characterized in that each sidewall of the sidewalls meets each sidewall of two adjacent sidewalls at a beveled corner of the generally rectangular shape, each of the four beveled corners defining a bearing surface (252, 254, 334, 336), the four bearing surfaces (252, 254, 334, 336) being elongate, planar, and disposed at an acute angle to both the vertical and the horizontal, and further wherein said four bearing surfaces (252, 254, 334, 336) are disposed to communicate substantially the entire load applied by the extendible axle member (146, 148) to the outer axle member (142, 144).

2. The extendible axle member (146, 148) of claim 1, wherein the four bearing surfaces (252, 254, 334, 336) are disposed, respectively, at the four beveled corners of the generally rectangular shape.

3. The extendible axle member (146, 148) of claim 1, wherein the upper bearing surfaces (252, 254) of the four bearing surfaces (252, 254, 334, 336), face upward and outward away from the extendible axle member (146, 148) and two lower bearing surfaces (334, 336) of the four bearing surfaces (252, 254, 334, 336), face downward and outward away from the extendible axle member (146, 148).

4. The extendible axle member (146, 148) of claim 1, wherein the four bearing surfaces (252, 254, 334, 336) are disposed at an angle of 45 degrees with respect to vertical and horizontal.

5. The extendible axle member (146, 148) of claim 4, wherein the four bearing surfaces (252, 254, 334, 336) comprise two upper bearing surfaces (252, 254) and two lower bearing surfaces (334, 336), with a first upper bearing surface (252) disposed directly above a first lower bearing surface (334) and a second upper bearing surface (254) is disposed above a second lower bearing surface (336).

6. The extendible axle member (146, 148) of claim 5, wherein each of the bearing surfaces (252, 254, 334, 336) defines a plane that is normal to said bearing surface and extends outward therefrom, said plane being disposed such that the portion extending outward from each of said bearing surfaces does not intersect the planes of any of the other bearing surfaces.

7. The extendible axle member (146, 148) of claim 1, wherein an outer end of the extendible axle member (146, 148) comprises steering knuckle mounts (178, 176).

8. The extendible axle member (146, 148) of claim 7, wherein the steering knuckle mounts (178, 176) define an axis of steering knuckle rotation (414) and further wherein the axis (414) is disposed rearward of two of the four bearing surfaces (252, 254, 334, 336) and forward of two of the four bearing surfaces (252, 254, 334, 336).

9. The extendible axle member (146, 148) of claim 8, wherein the axis of steering knuckle rotation (414) is generally vertical.

10. The extendible axle member (146, 148) of claim 1, wherein the four bearing surfaces (252, 254, 334, 336) include two pairs of bearing surfaces (252, 336 and 254, 334), each pair containing two bearing surfaces disposed at diagonally opposite corners of the elongate telescopic portion (400), wherein each bearing surface of each pair is parallel to the other bearing surface of each pair.

11. The extendible axle member (146, 148) of claim 1, wherein each bearing surface (252, 254, 334, 336) is disposed such that a force applied evenly to each bearing surface, in a direction perpendicular to that bearing surface, of a pair of diagonally opposed bearing surfaces (252, 336 and 254, 334) will apply a torque to the elongate telescopic portion (400).

12. The extendible axle member (146, 148) of claim 1, wherein the four bearing surfaces include a first pair (252, 336) and a second pair (254, 334) of bearing surfaces, wherein each member of the first pair and of the second pair define diagonally opposed corners of the elongate telescopic portion (400), and further wherein a first longitudinally extending plane (427) passing through a center of area (422) of the elongate telescopic portion (400) that is also perpendicular to at least one of the two surfaces (252, 336) of the first pair is disposed such that the two surfaces (252, 336) of the first pair are located on opposite sides of the first longitudinally extending plane.

13. The extendible axle member (146, 148) of claim 12, wherein both surfaces (252, 336) of the first pair are perpendicular to the first longitudinally extending plane.

14. The extendible axle member (146, 148) of claim 12 wherein a second longitudinally extending plane (426) passing through a center of area (422) of the elongate telescopic portion that is also perpendicular to at least one of the two surfaces (254, 334) of the second pair is disposed such that the two surfaces (254, 334) of the second pair are located on opposite sides of the second longitudinally extending plane.

* * * * *